July 11, 1933.  J. V. PUGH  1,917,459
FREEWHEEL CYCLE AND BRAKING MECHANISM THEREFOR
Filed Nov. 3, 1930  2 Sheets-Sheet 1
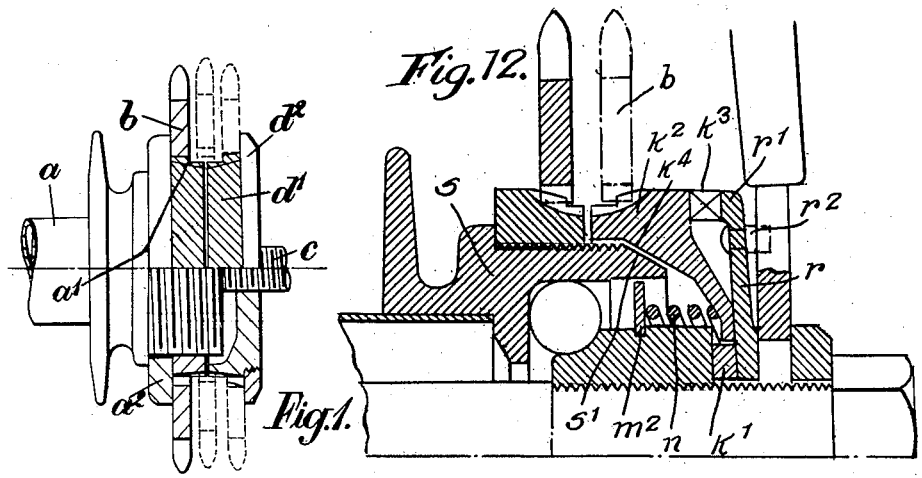
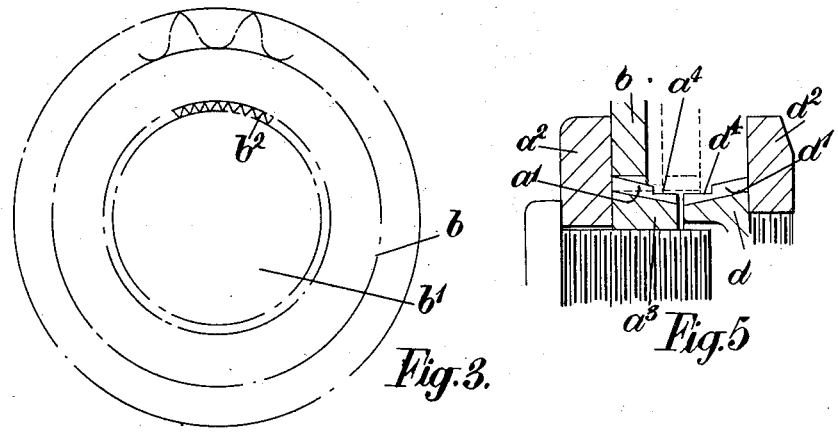
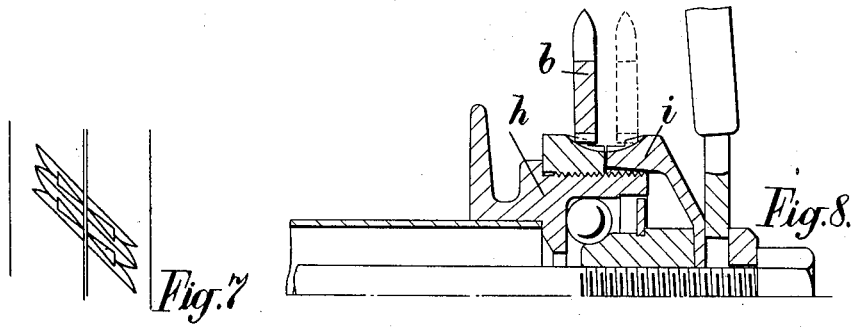
J. V. Pugh
INVENTOR July 11, 1933.    J. V. PUGH    1,917,459
FREEWHEEL CYCLE AND BRAKING MECHANISM THEREFOR
Filed Nov. 3, 1930    2 Sheets-Sheet 2
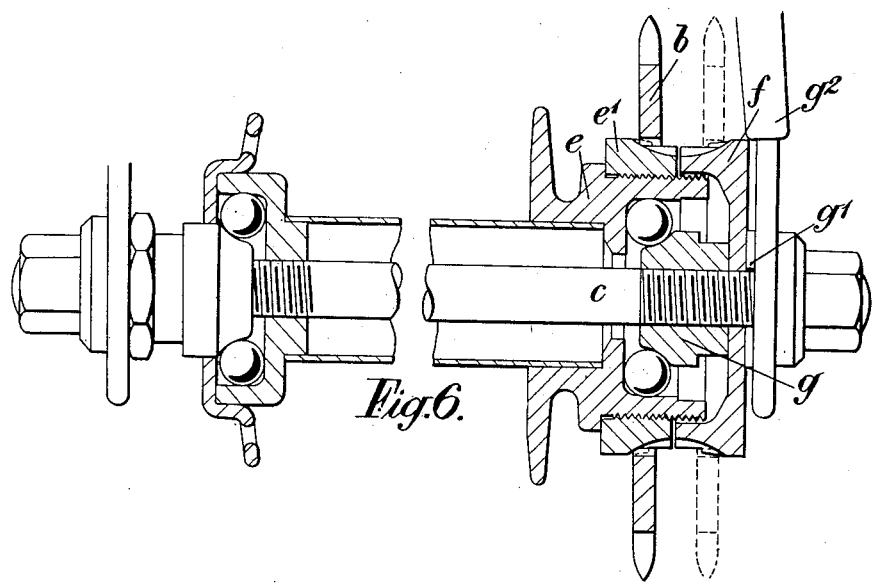
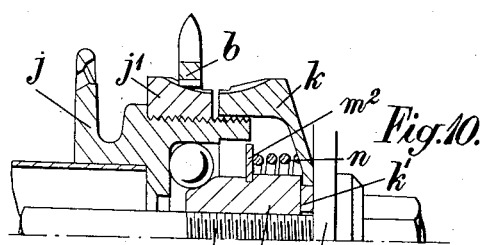
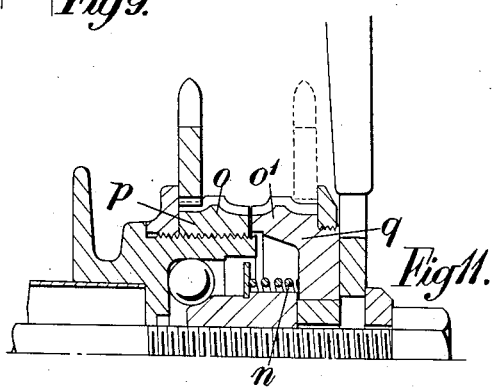
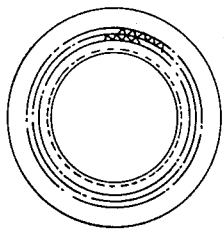
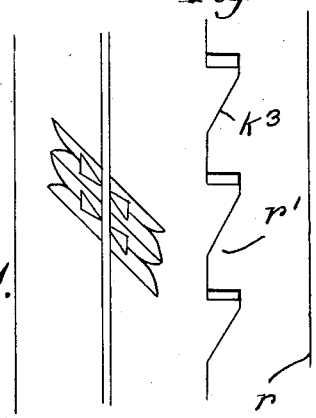
J. V. Pugh INVENTOR Patented July 11, 1933

1,917,459

UNITED STATES PATENT OFFICE

JOHN VERNON PUGH, OF MERIDEN, ENGLAND

FREEWHEEL CYCLE AND BRAKING MECHANISM THEREFOR

Application filed November 3, 1930, Serial No. 493,217, and in Great Britain November 8, 1929.

This invention relates to freewheel cycle hubs of the kind having a chain sprocket internally toothed for engagement with helical projections which are provided both upon the hub and also upon a member closely adjacent thereto and said sprocket is adapted to move axially on to and effect an engagement for driving the hub when rotated in one direction and to move axially on to and engage the adjacent member when oppositely rotated.

The object of the present invention is to provide improved devices for operating in the manner indicated.

The invention consists in a freewheel device of the kind indicated in which the chain sprocket in moving from one engagement to the other passes through a zone where there is no positive rotary engagement.

The invention further consists in a freewheel device as indicated in which the central aperture of a chain sprocket is provided with helically-disposed V-shaped internal teeth while complementary helically-disposed teeth upon a hub and upon a member adjacent thereto are provided upon surfaces which taper towards one another and/or are reduced in diameter at the abutting edges to provide a path on which the sprocket may remain without positively engaging either member but at the same time can have an axially directed force exerted thereon by movement of the chain.

The invention also consists in improvements in freewheel cycles and braking mechanism therefor as indicated in the following description.

Referring now to the accompanying drawings:—

Figure 1 is a section through the end of the hub in accordance with the invention, the upper half showing the helical surfaces in elevation and the lower half being a section through these parts;

Figure 2 is an end view of the adjacent member with some of the teeth or serrations shown thereon at the smaller and larger diameter;

Figure 3 is an end view of the chain sprocket, and

Figure 4 a section therethrough;

Figure 5 shows the serrated part of the hub end and the adjacent member to a larger scale with the chain sprocket shown in full lines in driving and dotted in intermediate positions;

Figure 6 is another view of a hub end with a fixed or stationary adjacent member, and Figure 7 is a fragmental plan showing the helical teeth or serrations;

Figure 8 is another view of a hub end of a slightly modified form, and

Figure 9 is a fragmental plan similar to Figure 7;

Figure 10 shows a longitudinal section through a hub in accordance with the invention having an adjacent member adapted for rotational movement against spring friction, and Figure 11 is another modification in which enlargements are formed upon the helically-serrated regions of the hub and adjacent member.

Figure 12 is a fragmentary longitudinal section through a hub constructed in accordance with the invention and embodying a braking device.

Figure 13 is a fragmentary plan view showing the helical teeth or serrations and also the cooperating cam surfaces constituting a part of the braking device.

In carrying the invention into effect as shown in Figures 1 to 5, a cycle hub $a$ is provided at the region where the chain sprocket is generally attached thereto with a helically-serrated region $a'$ with which internal teeth formed in the central aperture of a chain sprocket $b$ may engage. The chain sprocket $b$ which may be formed from plate material of uniform thickness has a central operture $b'$ provided with a ring of internal V-shaped teeth or serrations $b^2$ which may be disposed in a helical direction upon a cylindrical surface as shown in Figure 4.

Upon the end of the hub $a$ there is provided as shown in Figures 1 and 5 an engaging region for the chain sprocket $b$ in the shape of a ring $a^2$ of a diameter sufficiently larger than the central aperture of the chain sprocket to form an axial abutment for one side thereof and next to this ring $a^2$ and retaining it upon the end of the hub there is screwed another ring $a^3$ having teeth helically disposed thereon as shown at $a'$ and complementary to the teeth $b^2$ provided in the central aperture of the chain sprocket $b$. The helical teeth $a'$ on the ring $a^3$ are, however, preferably formed as shown upon a slightly conical surface instead of being upon a cylindrical one as in the case of the teeth of the chain sprocket $b$, the smaller end of the conical surface or region being situated upon the outer side.

Mounted upon the hub spindle $c$ adjacent to the back stay is another ring-like member $d$ with a helically-toothed region $d'$ which is a counterpart of the toothed portion $a'$ of the hub, this ring-like member $d$ having a screwed region adjacent the outer and larger end thereof upon which a plain ring $d^2$ may be screwed to form an axial abutment for the other side of the chain sprocket $b$ in the same manner as the corresponding member $a^2$ upon the hub.

The two helically-toothed and preferably conical regions $a'$ $d'$ of the hub and the adjacent member respectively are arranged with their smaller ends meeting one another in the centre of a helically-screwed region upon which the chain sprocket $b$ is mounted and the central portion of this region where the two helically-toothed regions meet is adapted by a suitable reduction in diameter as shown at $a^4$ and $d^4$ to provide a partial zone upon which the chain sprocket $b$ may ride as shown in dotted lines in Figure 5 without effecting positive engagement with either side or, in other words, in moving axially from the hub surface $a'$ on to the adjacent member surface $d'$ or from the adjacent member on to the hub the chain sprocket passes over an intermediate region in which it is able to clatter over or overrun both surfaces without positively engaging either.

The above path or zone $a^4$, $d^4$ will be of a sufficiently reduced overall diameter to allow of the overrunning but the points of the teeth $b^2$ of the sprocket wheel will, however, be still capable of being drawn by force exerted on the chain into engagement with the portions extending across the path or zone of the teeth upon the two conical regions $a'$, $d'$ and by this means force exerted upon the chain in one direction or the other will cause the sprocket wheel to travel axially either wholly on to the hub to effect driving engagement therewith or wholly on to the adjacent member.

In Figure 6 the hub end $e$ has a ring $e'$ screwed thereon with helical teeth as shown in Figure 7 which may be cut by a circular member such as a hob or the like, the teeth being arranged to fade out into the cylindrical portion of the ring and thus form an axial abutment for the edge of the chain sprocket $b$.

In this construction the adjacent member $f$ is formed with teeth of a similar kind to those upon the hub ring $e'$, the two sets of teeth being preferably cut at a single operation.

As shown in this figure the adjacent member $f$ is clipped between the cone $g$ and a washer $g'$ upon the hub spindle $c$, the washer being in contact with the chain stay $g^2$.

Figures 8 and 9 show a slightly modified construction in which the cylindrical member or hub for forming the teeth is of smaller diameter and the chain sprocket $b$ will move a smaller axial distance from driving engagement with the hub $h$ to its position upon the adjacent member $i$.

In the construction shown in Figure 10 the chain sprocket $b$ is adapted to move from one to the other of the ring $j'$ upon the hub $j$ and the adjacent member $k$, the teeth being of the kind described in connection with Figures 6 to 9. In this form, however, the adjacent member $k$ is mounted so that it is free to rotate upon a collar $k'$ positioned upon the hub spindle $c$ between the cone $m$ and the chain stay $m'$. A washer or disc $m^2$ is positioned upon the cone $m$ and retains a spring $n$ in contact with the inner face of the adjacent member $k$ so that this member is free to rotate against the friction of the spring. The adjacent member $k$ is thus held so that on back pedaling the pedals can be moved round further than they could with an actual stationary piece. This is convenient in a general sort of way and is also very important because it enables the rider to bring his pedals round to what he finds a convenient position in traffic; presumably with the right foot or else with the left foot nearest the ground. This is not only better for traffic but appears to get rid of the irritating clatter between free and driving.

The arrangement illustrated in Figure 11 shows a larger diameter piece $o$ and $o'$ on both the driving hub part $p$ and on the adjacent member $q$. In this arrangement a friction spring $n$ is provided as above described and the larger diameter pieces $o$ and $o'$ furnish a sort of hump or hook on which the chain wheel rests either in the driving position or in the free position and the chain wheel will naturally remain in its position unless some effective drive or back pedalling effort is applied.

The adjacent member can be used when moved to operate a brake applied to the cycle wheels, such an arrangement being shown in Figures 12 and 13 where the adjacent member $k^2$ movable as in the modification shown in Figure 10 is provided with inclined cam surfaces $k^3$ adapted to cooperate with complementary surfaces $r^1$ formed on the rim of a disc $r$ which is stopped from rotational movement by a pin $r^2$ engaging the fork end.

The adjacent member $k^2$ is provided with an interior cone surface $k^4$ which is adapted to cooperate with a complementary cone surface $s'$ upon the hub end $s$. The adjacent member $k^2$ when supporting the sprocket $b$ as shown in dotted lines is given a small movement by reverse movement of the pedals and due to the engagement of its cam surfaces with the cam surfaces of the member $r$ is forced in an axial direction to the left so that the cone surfaces $k^4$, $s'$ are brought into engagement and a braking action exerted on the wheel. The spring $n$ operates to disengage the braking surfaces as soon as forward pedalling is resumed.

The method of forming the tapering helically-toothed portions and the shouldered regions adjacent thereto is given as an example of carrying the invention into effect and these parts may be otherwise formed in any suitable manner which will provide a non-positive engagement region or path for the chain sprocket when moving in an axial direction from engagement with the hub to engagement with the adjacent member. Other modifications and additions may also be introduced without departing from the nature of the invention as set forth in the foregoing statements.

I claim:

1. A freewheel device for cycles having in combination a hub, a member concentric with said hub and adjacent to an end thereof, substantially abutting annular shoulder surfaces on said member and said hub, a centrally apertured chain sprocket adapted to ride freely on a zone at the periphery of said abutting shoulder surfaces, internal helically disposed teeth formed round the aperture of said chain sprocket, two similar sloping surfaces of revolution one on said hub and one on said member receding from said shoulder surfaces and teeth thereon complementary to said sprocket teeth and adapted to engage fully therewith at the remote or larger ends of said sloping surfaces.

2. A freewheel device for cycles having in combination a hub, a member rotatably mounted concentric with said hub and adjacent to an end thereof, substantially abutting annular shoulder surfaces on said member and said hub, means creating frictional resistance to the rotation of said member, a centrally apertured chain sprocket adapted to ride freely on a zone at the periphery of said abutting shoulder surfaces, internal helically disposed V-shaped teeth formed round the aperture of said chain sprocket, two similar flaring surfaces of revolution one on said hub and one on said member receding from said shoulder surfaces and teeth thereon complementary to said sprocket teeth and adapted to engage fully therewith at the remote or larger ends of said flaring surfaces.

3. A freewheel device for cycles having in combination a hub, a member concentric with said hub and adjacent to an end thereof, substantially abutting annular shoulder surfaces on said member and said hub, a centrally apertured chain sprocket adapted to ride freely on a zone at the periphery of said abutting shoulder surfaces, internal helically disposed teeth formed round the aperture of said chain sprocket, two similar surfaces of revolution one on said hub and one on said member receding from said shoulder surfaces, teeth on said similar surfaces complementary to said sprocket teeth and adapted to engage fully therewith at the remote ends of said similar surfaces and regions on said similar surfaces between their adjacent and remote ends of such enlarged diameter that additional force is required to carry said sprocket over said enlarged regions from one to the other of its extreme positions.

4. A freewheel device for cycles having in combination a hub, a member concentric with said hub and adjacent to an end thereof, substantially abutting annular shoulder surfaces on said member and said hub, a centrally apertured chain sprocket adapted to ride freely on a zone at the periphery of said abutting shoulder surfaces, internal helically disposed teeth formed round the aperture of said chain sprocket, two similar sloping surfaces of revolution one on said hub and one on said member receding from said shoulder surfaces, teeth on said surfaces of revolution complementary to said sprocket teeth and adapted to engage fully therewith at the remote or larger ends of said sloping surfaces and collar shoulders adjacent said remote ends against which said sprocket axially abuts due to the tooth reaction.

5. A freewheel device for cycles having in combination a hub, a member concentric with said hub and adjacent to an end thereof, substantially abutting annular shoulder surfaces on said member and said hub, a centrally apertured chain sprocket having internal helically disposed teeth formed round the aperture thereof, a circular path surrounding said shoulder surfaces on which said sprocket rides without positive rotational engagement with either the hub or the adjacent member, said path having transverse grooves which correspond with the sprocket wheel teeth and into which grooves said teeth may be drawn by chain action to create axial movement of said sprocket, two similar sloping surfaces of revolution one on said hub and one on said member receding from said path and teeth thereon complementary to said sprocket teeth and adapted to engage fully therewith at the remote or larger ends of said sloping surfaces.

6. A freewheel device for cycles having in combination a hub, a member concentric with said hub and adjacent to an end thereof, substantially abutting annular shoulder surfaces on said member and said hub, a centrally apertured chain sprocket having internal helically disposed teeth formed round the aperture, a circular path surrounding said shoulder surfaces on which said sprocket rides without positive rotational engagement with either the hub or the adjacent member, said path having transverse grooves which correspond with the sprocket wheel teeth and into which grooves said teeth may be drawn by chain action to create axial movement of said sprocket, two similar sloping surfaces of revolution one on said hub and one on said member receding from said path, teeth thereon complementary to said sprocket teeth and adapted to engage fully therewith at the remote or larger ends of said sloping surfaces and regions on said similar surfaces between their adjacent and remote ends of such enlarged diameter that additional force is required to carry said sprocket over said enlarged regions from one to the other of its extreme positions.

In testimony whereof I have signed my name to this specification.

JOHN VERNON PUGH.